June 10, 1947.  S. RUBEN  2,422,045
ALKALINE DRY CELL
Filed July 10, 1945  3 Sheets-Sheet 1
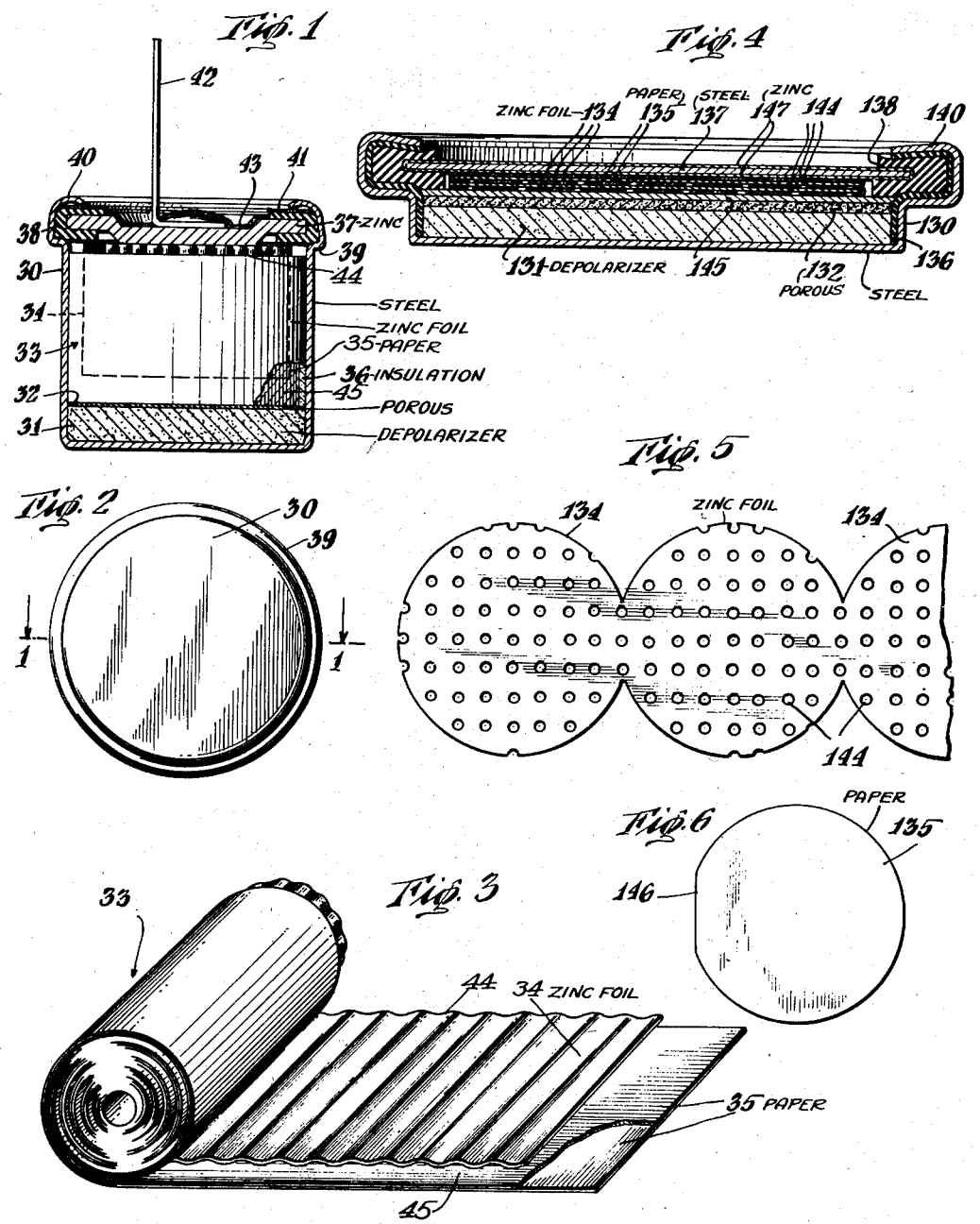
INVENTOR
Samuel Ruben
BY Chester F. Carlson
ATTORNEY

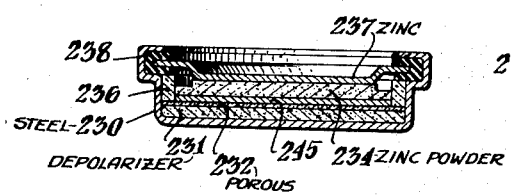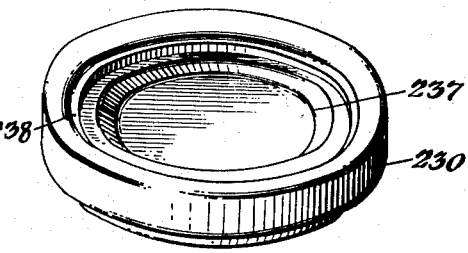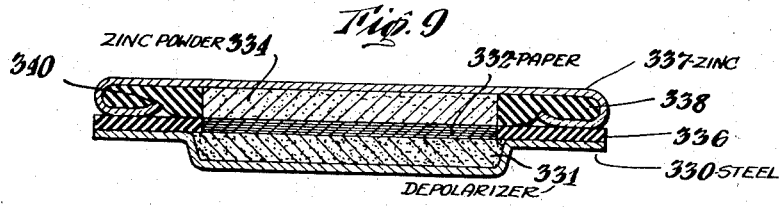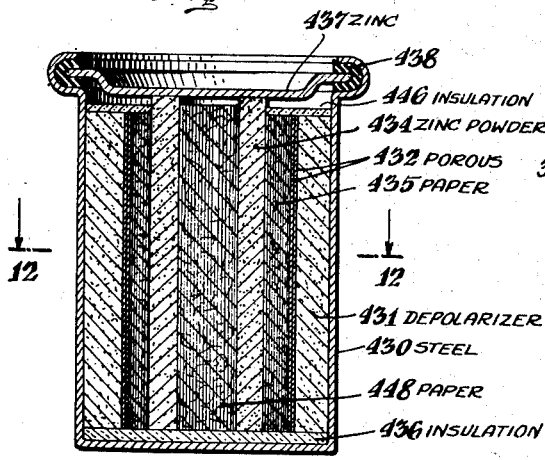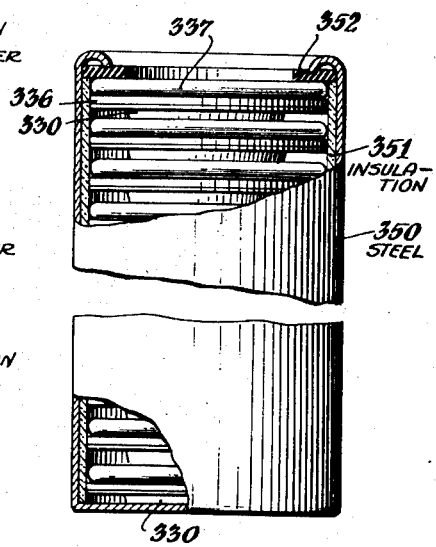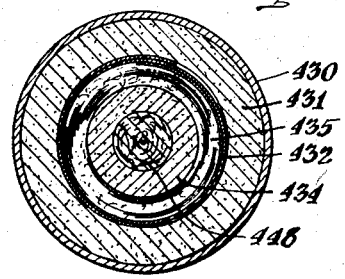

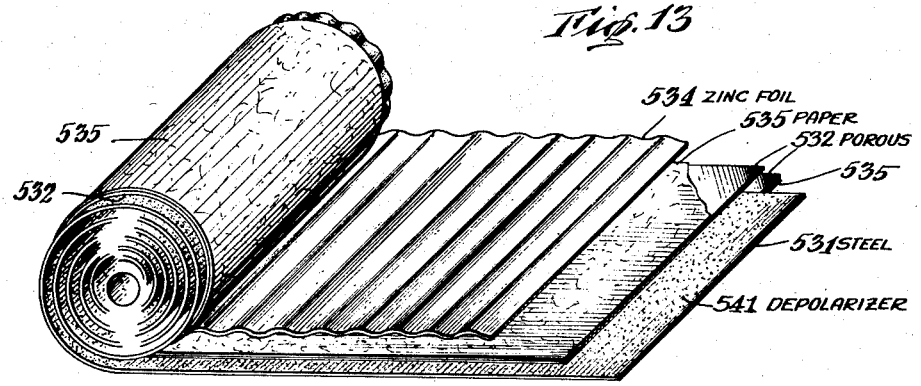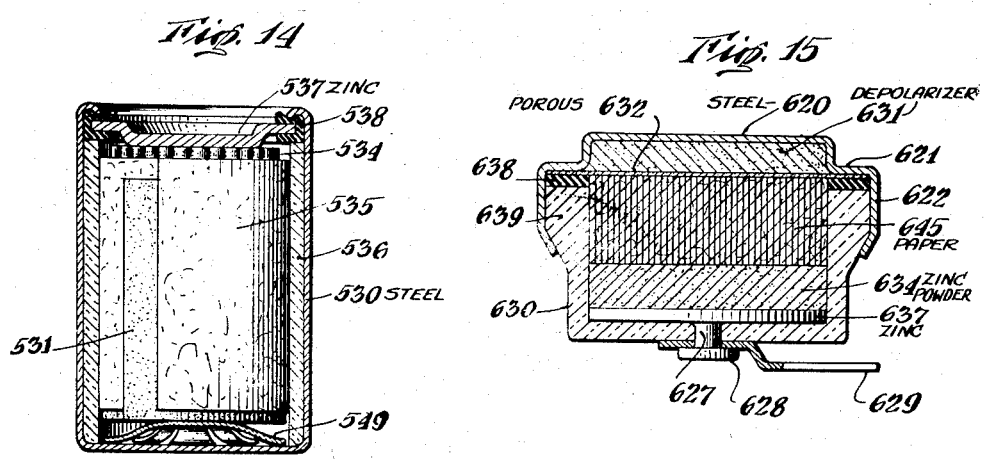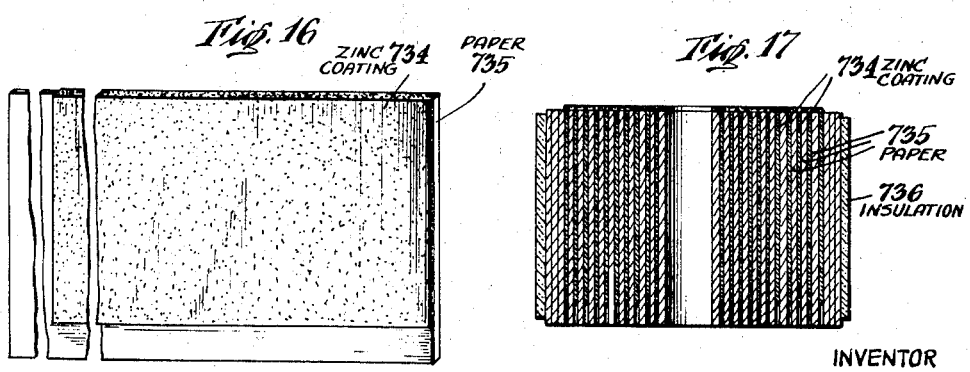

Patented June 10, 1947

2,422,045

UNITED STATES PATENT OFFICE 2,422,045

ALKALINE DRY CELL

Samuel Ruben, New Rochelle, N. Y.

Application July 10, 1945, Serial No. 604,269

57 Claims. (Cl. 136—107)

This invention relates to electric current-producing primary dry cells.

The history of what has been done commercially correctly evidences the inability of the art, heretofore, to devise a practical alkaline dry cell to meet military or commercial requirements. It is a comprehensive object of the present invention to provide an improved primary dry cell, specifically and exclusively an alkaline dry cell, which will better serve many of the present dry cell military and commercial requirements and even open new markets and applications not attainable by prior dry cells, and which is characterized by new chemical and structural combinations of elements cooperating to provide advantageous and improved characteristics in many, and preferably all, of the following respects, among others:

A relatively high output current capacity under continuous load for a relatively long time;

Substantially sustained voltage or flat voltage discharge curve with continuous output throughout relatively long cell life;

A relatively low internal resistance with relatively high immunity to internal electrical leakage over a relatively wide temperature range;

An effective maintenance of low internal ohmic resistance within close limits during cell operation, allowing discharge through load at a relatively high and sustained potential throughout effective cell life, which permits use in radio circuits and the like without the necessity of special shunt capacitance filter circuits;

A relatively high ratio of current output capacity to cell volume, more particularly with respect to the volume of electrolyte the quantity of which in effective cells of the present invention may be relatively small;

A relatively high ratio of current output above accepted cut-off voltage to total current output capacity;

A relatively long open circuit life over a relatively wide temperature range without undue internal deterioration; and A relatively low generation of internal gas pressure on either open or closed circuit.

The objects of the invention will become more apparent from the following description and claims taken in connection with the accompanying drawings. in which are shown a number of different forms of cells embodying features of the invention, and steps in their construction.

In the drawings:

Figures 1 to 3 inclusive illustrate a cell embodying features of the invention in which an anode roll is arranged above a cathode body, and its method of construction, Figure 1 being a vertical sectional view, Figure 2 a bottom view, and Figure 3 illustrating a method of forming the anode assembly;

Figures 4 to 6 inclusive show a flat or sandwich form of such cell using a perforated foil anode, Figure 4 being a vertical sectional view, and Figures 5 and 6 showing details of component parts thereof; and Figures 7 to 17 inclusive illustrate modified forms of cell construction and component parts thereof embodying features of the present invention, as will be more fully hereinafter described.

This application is a continuation-in-part of my previously filed co-pending applications listed below, and in the present application is presented a collective description of conjointly useful and cooperative novel features of my invention and generic claims thereto. Those applications are:

Serial No. 456,160, filed August 26, 1942, in which is disclosed an alkaline dry cell having a zinc anode, a conductive cathode comprising copper oxide or the like, an alkali metal hydroxide electrolyte and barrier means such as a semi-permeable membrane of regenerated sheet cellulose between the anode and cathode.

Serial No. 468,386, filed December 9, 1942, in which is disclosed an alkaline dry cell in which the electrolyte is immobilized as a solid hydroxide containing water of hydration.

Serial No. 473,320, filed January 23, 1943, in which a mercuric oxide depolarizer is disclosed in an alkaline dry cell.

Serial No. 486,367, filed May 10, 1943, in which is disclosed an alkaline dry cell electrolyte containing a substantial quantity of dissolved zinc oxide.

Serial No. 492,050, filed June 24, 1943, in which several forms of barrier means including rigid barriers are disclosed in alkaline dry cells.

Serial No. 513,687, filed December 10, 1943, in which is disclosed a dry cell structure generally similar to that shown in Figure 1 of the present application.

Serial No. 522,587, filed February 16, 1944, in which is disclosed an alkaline dry cell having a porous anode of zinc amalgam powder.

Serial No. 542,722, filed June 29, 1944, in which is disclosed a dry cell having a construction similar to that illustrated in Figure 4 of the present application.

Serial No. 575,089, filed January 29, 1945, in which is disclosed a conductive cathode containing lead peroxide, and also a dry cell having a construction similar to that illustrated in Figure 11 of the present application.

Serial No. 575,090, filed January 29, 1945, in which is disclosed a conductive cathode containing an alkali metal permanganate.

Serial No. 580,172, filed February 28, 1945, in which is disclosed a conductive cathode containing an alkaline earth metal permanganate.

Serial No. 582,594, filed March 14, 1945, in which is disclosed a conductive cathode containing a silver or copper permanganate.

Considered broadly, the present invention comprises an alkaline dry cell having an amalgamated zinc anode; a cathode of a depolarizer material including an electrolytically reducible oxygen-yielding compound, such as electrolytically reducible metal oxides and permanganates; and an alkaline electrolyte, such as an aqueous solution of an alkali metal hydroxide initially containing a substantial quantity of dissolved zinc; said electrolyte being immobilized against free motion or flow from the anode to the cathode or vice versa, preferably by means which physically space them apart and comprise absorbent, or minutely porous and ionically permeable, inert material or materials whereby migration of impurities and deleterious materials from the cathode to the anode or vice versa is inhibited; all as more fully hereinafter described.

Referring to the drawings, Figures 1 to 3 inclusive, illustrate as one embodiment of the invention an airtight dry cell. The cell comprises a cup or container 30, of a relatively inert metal, such as steel, in the bottom of which is pressed a cathode 31 of depolarizer material comprising an electronically-conductive coherent compressed mass including a suitably electrolytically-reducible oxygen-yielding compound of a metal, such as an oxide of silver or mercury or a suitable permanganate as hereinafter more particularly described. The cathode is covered by a minutely porous and ionically permeable barrier disc 32 comprising part of the spacing means between the anode and cathode, the barrier disc being permeable to electrolyte but substantially limiting or preventing travel of deleterious materials from one electrode to the other. Where a readily soluble depolarizer is used the barrier also acts to retard dissolving thereof.

An anode assembly 33 is pressed against the top face of barrier 32 and comprises a roll of amalgamated zinc foil 34 interwound with a strip of porous electrolyte-retaining sheet spacing material 35, such as Dexter or filter paper, held in an insulating sleeve 36 of non-porous material such as polystyrene. An edge 44 of the zinc foil 34 projects at the top of the roll, likewise an edge 45 of the spacing material 35 projects at the bottom of the roll and into contact with the barrier disc 32, thereby providing spacing means between the anode and cathode, supplementing the spacing provided by barrier disc 32. Against the edge of the zinc foil projecting at the top of the anode assembly 33 is pressed a top disc 37 of conductive metal, preferably amalgamated zinc, which is insulated from the container 30 but sealed against the shoulder 39 thereof by a grommet 38 of suitable insulating material such as neoprene, the top disc having a depressed central portion in contact with the projecting edge of the zinc foil anode with which it readily forms an amalgam bond. The elements of the entire assembly are held in their relative positions and under pressure contact by means of a turned over edge 40 of the container 30, which has a metal washer 41 interposed between it and the grommet 38. Secured to the top disc 37 is a terminal tab 42 and if desired the entire top disc surface may be coated with an air-excluding lacquer film 43. The top disc 37 may serve alone or together with tab 42 as the negative cell terminal.

If cell materials of reasonable purity are used there will be substantially no gas generation under normal operating conditions during the effective life of the cell. The neoprene grommet 38 will permit sufficient gas diffusion to allow escape of any slight amount of gas which may be generated within the cell due to local action, if any. If further venting means are found desirable to provide for unusual conditions they may of course be provided. For example, a more porous neoprene grommet may be used which is impregnated with oil. Another suitable method is to amalgamate the zinc top 37 to such an extent that it becomes brittle so that if an excess gas pressure develops it will produce cracks in the top through which venting can take place.

The top disc, however, should be strong enough to hold the internal elements of the cell together under substantial mechanical pressure during normal cell life to insure good contact therebetween and assure maintenance of low internal resistance throughout effective life; for example, a pressure sufficient to compress the anode assembly roll 33 as much as ten per cent (10%) or more in length or axially during the sealing operation. Maintenance of low internal resistance throughout effective life of the cell is of importance to all uses characterized by appreciable current drain.

The use of the enclosing elements inclusive of the sealing grommet prevents ingress of air and consequent carbonation of cell contents; any closure accomplishing this result being therefore referred to hereinafter as "airtight." Also such structural and assembly characteristics limit the quantity of air entrapped in the cell when made to an amount assuring that no damaging carbonation or anode oxidation will take place internally. The sealing of the cell also prevents evaporation of electrolyte. If desired, the grommet can be sealed to the surface of the top disc with neoprene cement to insure against electrolyte creepage.

A method of making the anode assembly 33 is illustrated in Figure 3. The strip of zinc foil 34, preferably corrugated to accommodate swelling of the spacer when impregnated with electrolyte, is laid on a strip of fibrous sheet material 35 such as Dexter paper, filter paper or fibrous polystyrene sheet with the zinc projecting along one edge and the fibrous sheet along the other. They are then interwound into a roll which is inserted in the sleeve 36 of insulating material, such as a tube of polystyrene film.

It is preferable that paper strip 35 should be resistant to alkalies. A paper which has been used successfully is formed from a mixture of wood and hemp fibres, the paper pulp being treated or washed with an alkali solution, such as sodium hydroxide solution, in the process of paper manufacture. This produces a reaction of the alkali with part of the paper constituents and results in a paper which is resistant to alkalies and hence will not be greatly weakened by the alkaline electrolyte to be used in the primary cell. Jute and cotton fibre papers may also be used for strip 35 and in some cases may be of sufficient purity or alkali resistance so that the alkali treatment of the pulp may not be required.

The zinc anode foil 34 should have its metallic constituents (other than the mercury introduced for amalgamation) formed predominantly of zinc. It may consist of substantially pure zinc or zinc alloyed with a minor amount of another metal which is capable of being amalgamated and is operable with zinc as anode material, e. g. zinc with a minor proportion of cadmium. Where zinc is used in the form of powder anodes it has been found that a small amount of lead, such as four to five hundredths of one per cent (.04 to .05%) lead, in the zinc has an inhibiting effect on gas generation. However, metals which tend to produce serious local couples with zinc, such as iron, copper and tin, should preferably be kept to a low proportion, such as below two thousandths of one per cent (.002%) in the anode.

In practice the zinc should be amalgamated before use in the cell to provide a unipotential surface and minimize the effect of impurities in producing local electric couples which would result in local electrochemical attack. In the cell construction illustrated amalgamation performs the further function of forming an amalgam bond to the top terminal of the cell. The extent of amalgamation may be less with zinc of extreme purity.

Since amalgamated zinc foil is too brittle to wind into a roll the amalgamation is performed after rolling. The roll is first impregnated with electrolyte which causes the spacer 35 to swell into the space afforded by the corrugations in the zinc foil. A measured quantity of mercury is distributed on top of the roll in contact with the zinc, the amount of mercury used depending on the area and weight of the zinc and is determined by calculation or experiment. Desirable proportions of mercury are five to twenty per cent (5 to 20%) of the weight of the zinc. The roll is then placed on a porous suction plate which draws the mercury into the roll and removes excess electrolyte. The electrolyte promotes spreading of the mercury so that the entire zinc surface becomes amalgamated in a short time.

An impregnated anode assembly in this condition is then placed in container 30 with the projecting fibre and in contact with barrier disc 32 which becomes impregnated by absorption of some of the electrolyte from the anode roll. The insulating sleeve 36 isolates the anode assembly from the wall of the container, preventing localized electrochemical action between the anode and steel container wall.

The weight ratio of retained electrolyte to spacer material is preferably kept between three to one and six to one (3:1 and 6:1) to insure the absence of any free-flowing electrolyte, in other words, to insure that the electrolyte retained will be substantially immobilized.

The barrier disc 32 may comprise one or more layers of minutely porous and ionically permeable material, for example, porous discs of suitable organic materials which are inert to the electrolyte and depolarizer formed in any suitable manner such as by punching from sheets of pressed polystyrene fibre, nylon fibre, etc., or formed from pressed powders of such materials as polystyrene, vinyl resins and vinylidene resins. Porous spacers of inorganic material, such as pressed discs of magnesium silicate or magnesium hydroxide powder, pressed ceramic or glass powders, or purified sheet asbestos, may also be used. Glycerine-plasticized sheets of polyvinyl alcohol, parchment paper of dialysis grade and regenerated sheet cellulose may also be used.

The barrier disc 32 and the projecting edge of the rolled strip of porous electrolyte carrier material 35 afford mechanical spacing means between the cathode 31 and the rolled anode foil 34 and also prevent or limit migration of compounds and solids between the cathode and the anode. For this purpose the barrier, or at least one layer of it, should have very fine pores, which permit the electrolyte to permeate therethrough for electrical contact with the cathode 31 but are so small that free circulation of electrolyte and such migration are reduced to a negligible rate or entirely prevented. By using such a fine porosity the thickness of the barrier means or means spacing the anode from the cathode, and consequent internal resistance of the cell, can be kept low.

The spacing means between the electrodes may thus include, as separate elements, both a minutely porous barrier and a more porous electrolyte carrier. It is to be understood, however, that the porous electrolyte carrier material may be of such character as to serve the dual functions of electrolyte carrier and barrier means. A structure employing such a single spacing means having a dual function is disclosed in Figure 9 and hereinafter described.

The spacing between the anode and cathode may be very small, for example in the order of twenty mils (20 mils), if adequate barrier means is used. With greater spacing, at least in the order of sixty mils (60 mils) between anode and cathode the porosity of the spacer need not be as fine. In fact, porous Dexter paper, the alkali treated pulp paper or filter paper, or a layer of more inert material can be used as spacer and barrier for such cells for moderate or low temperature use, where the depolarizer is relatively insoluble, such as mercuric or silver oxide, and where a sacrifice of shelf life is tolerable.

Effective barrier means is particularly essential with soluble depolarizers of high oxidizing value, such as the permanganates and lead peroxide. In this case a barrier of very fine porosity, and formed of material which is not readily oxidizable by the depolarizer, such as a fine porosity ceramic layer, should be used. The barrier prevents direct contact of the solid depolarizer with any oxidizable organic spacer material used, such as paper, and also retards dissolved depolarizer from reaching either the paper or the anode surface.

In the case of permanganates, contact of paper with the solid or dissolved depolarizer has two deleterious effects, namely (1) it oxidizes and carbonizes the paper and (2) it consumes the available oxygen in the depolarizer.

In order completely to prevent circulation of dissolved depolarizer around the edge of the barrier it is desirable that the edge of the barrier be cemented or sealed to the containing wall.

The cathode 31 is formed from depolarizer material comprising an electronically-conductive coherent mass including an electrolytically reducible oxygen-yielding compound. Suitable compounds are, for example, mercuric or mercurous oxide, the oxide or peroxide of silver, cupric or cuprous oxide, lead peroxide, potassium permanganate or another alkali metal permanganate, calcium permanganate or another alkaline earth metal permanganate, silver permanganate, lead permanganate and copper permanganate. Other oxygen-yielding compounds which are readily electrolytically reducible may also be used. Those which readily reduce to more electrically conductive compounds or materials during cell operation, i. e., the oxides of mercury and silver, are preferred where lowest internal resistance during cell operation is considered advantageous.

In cells using mercuric oxide as the depolarizer material it is generally satisfactory to compress a quantity of loose particles of the depolarizer material into a coherent porous mass or pellet and locate it directly against the cleaned inner surface of the bottom of the steel container 30. However, the other oxides as well as the permanganates appear to develop a potential difference or polarized layer at the junction with the steel after electrolyte has penetrated to this junction, resulting in a marked lowering of output voltage of such cells. With such materials it is desirable, therefore, to provide a non-polarizing layer such as graphite at the junction. This can be accomplished by graphitizing the inner surface of the bottom of the steel can before use, by spraying a layer of graphite and binder onto the steel or by providing thereat a carbon body, disc or layer to which the cathode is bonded. A suitable paint may be formed of ten per cent (10%) by weight of graphite and two per cent (2%) ethyl cellulose in a xylol solution.

Many of the oxygen-yielding compounds mentioned are low in electrical conductivity and hence it is usually desirable to mix with them a conductive ingredient in as intimate contact as possible. The preferred ingredient is graphite although other conductive materials such as finely divided silver, iron, and the like may be used where they do not result in deleterious local reactions. If the oxygen-yielding compound is sufficiently conductive itself, the addition of such conductive material may be dispensed with. For example, silver oxide has sufficient conductivity to be used alone as a cathode for some cells. In the latter case it has been found to be advisable initially to age the cell by passing a small current through it for about an hour to increase the cathode conductivity by the development of silver stringers through it.

Where graphite is used in the depolarizer material, micronized natural graphite, such as Madagascar, Ceylon, Mexican or Zanzibar graphite, has been found to give the best results. It can be used in various proportions, the most useful cathodes containing from one to fifty per cent (1–50%) graphite, with five to ten per cent (5–10%) graphite being preferred. The micronized graphite should have an extremely small particle size, in the order of five to ten (5 to 10) microns diameter. The graphite and finely powdered oxygen-yielding compounds are thoroughly mixed to form a graphite coating on the compound particles and the mixture is compressed into the bottom of container 30, or first compressed into a pellet which is then pressed into the bottom of the container, under high pressure, such as twenty thousand pounds per square inch (20,000 lbs. per sq. in.) to produce a coherent mass of depolarized material.

The preferred alkali metal hydroxide electrolyte consists of an aqueous solution of potassium hydroxide initially containing in solution a substantial quantity of zinc in the form of a compound or compounds commonly called "zincates," the zincate being present in an amount sufficient to reduce the open-circuit chemical attack on the anode to a negligible value.

The preferred range of concentration of the potassium hydroxide used in preparing the electrolyte for a cell of the construction shown in Figure 1 and most other cell structures is from thirty to fifty per cent (30 to 50%) KOH. Concentrations above and below these limits can be used but generally result in lower cell output efficiencies. However, this depends considerably upon the cell construction and conditions of use and it is feasible with certain of the structures illustrated to depart rather widely from the preferred range, even to the extent of using such a high concentration of KOH as to produce an electrolyte which is solid at normal temperatures.

For minimum attack on the amalgamated zinc anode by the electrolyte when the cell is standing on open circuit, the electrolyte should contain all the zinc it will take up at the temperatures to which the cell is to be subjected. However, I have found that proportions of zincate down to about one-half this optimum concentration will, in many cases, particularly for moderate temperature uses, produce only minute gas generation, the rate being sufficiently slow to permit generated gas to diffuse out of the cell through the grommet or other sealing means without deleteriously affecting the desired airtight enclosure of internal cell elements. The quantity of zinc which will dissolve in the electrolytes appears to be proportional to the alkali concentration. It is preferred that the electrolyte shall contain about from ten to twenty grams (10 to 20 gms.) of zinc for each one hundred grams (100 gms.) of KOH used in preparing the electrolyte. It is apparent that the reaction of zinc or zinc oxide with the potassium hydroxide in preparing the electrolyte will convert part of the potassium hydroxide to potassium zincate. The reaction is reversible, however, so that a chemical titration of the completed electrolyte will indicate the total potassium hydroxide originally used, before reaction with zinc or zinc oxide. The best range for electrolytes made from thirty to fifty per cent (30 to 50%) KOH solution is about fifteen to seventeen grams (15 to 17 gms.) of zinc per one hundred grams (100 gms.) of KOH used.

I have made a satisfactory electrolyte for cells of the type shown in Figure 1 by adding seventy-five grams (75 gms.) of C. P. potassium hydroxide (containing 88% KOH) to twenty-five milliliters (25 ml.) of water, adding twelve grams (12 gms.) of zinc oxide, stirring and heating to one hundred eighty to one hundred ninety degrees centigrade (180–190° C.). The solution was then allowed to cool to one hundred ten degrees centigrade (110° C.), after which twenty-five milliliters (25 ml.) of water was added and the solution stirred and cooled to eighty degrees centigrade (80° C.). An additional fifty milliliters (50 ml.) of water was added and a clear solution was obtained. Made in this way the electrolyte does not precipitate any zinc oxide when cooled to room temperature. This solution appears to be about seventy-five percent (75%) saturated with zinc at room temperature.

In cases where a more viscid electrolyte is desirable it is possible to use an electrolyte containing one hundred grams (100 gms.) of C. P. potassium hydroxide to one hundred milliliters (100 ml.) of water and sixteen grams (16 gms.) of zinc oxide, made by a similar method.

In the preferred cells of the present invention the electrolyte is neither consumed nor evaporated during shelf life and is continuously regenerated during cell operation so that its concentration and volume remains substantially constant. It is therefore necessary to provide only sufficient electrolyte adequately to wet the anode and cathode and provide a good conductive path through the spacer. In some instances as little as one cubic centimeter (1 cc.) of electrolyte per ampere-hour rating of the cell can be used. This corresponds to about one fourth cubic centimeter (¼ cc.) per gram of depolarizer for a mercuric oxide cell.

If the alkaline solution is not saturated with zincate, the zinc hydroxide formed on the anode during the first period of cell operation may be dissolved until the electrolyte will not take up any additional zinc. Also, if such a cell is allowed to stand on open circuit for an extended period of time before first use some of the zinc may be dissolved chemically with the accompanying formation of a small amount of hydrogen gas; but, if a substantial quantity of zincate is used, this rate will be very slow so that upon build-up of moderate pressure the gas may leak out through or past the neoprene grommet without endangering the desired airtight enclosure, and the life and operation of the cell will not be seriously affected thereby.

Although a potassium hydroxide electrolyte may be preferred, the present invention contemplates within its scope the possible employment of other alkali metal hydroxide electrolytes such as sodium hydroxide, lithium hydroxide and mixtures of such hydroxides, and other suitable alkaline electrolytes.

So far as I am aware, the prior art has been unable to achieve a commercially successful alkaline dry cell. Some of the operational advantages of my improved dry cell over prior art wet alkaline cells having depolarizer cathodes similar as to chemical make-up to certain depolarizers proposed herein will be made clear from a comparison of the chemical reactions involved at the zinc anodes of two cells, one constructed in accordance with the prior art, and the other in accordance with the present invention and including an alkali metal hydroxide electrolyte substantially saturated with zinc.

In the prior art cell hydrogen gas is generated at the anode both on open and closed circuit, according to the equation:

$$Zn \text{ plus } 2KOH = K_2ZnO_2 \text{ plus } H_2$$

whereas in the present improved cell substantially presaturated with zincate there is no substantial generation of gas at the anode either on open or closed circuit and any that is formed is diffused out slowly through or past the resilient grommet.

Prior art alkaline cells, wherein the electrolyte is not saturated with zincate, and wherein mercuric oxide is used as depolarizer, can be expressed as: (The symbol F as used in the following formulas indicates one faraday.)

$$Zn | KOH, H_2O | HgO$$

The reactions taking place in these cells during operation can be expressed as follows:

At anode:

$$Zn + 2F = Zn^{++}$$
$$2KOH = 2K^+ + 2OH^-$$
$$Zn^{++} + 2OH^- = Zn(OH)_2$$
$$Zn(OH)_2 + KOH = KHZnO_2$$

At cathode:

$$2K^+ - 2F = 2K$$
$$2K + HgO = K_2O + Hg$$
$$K_2O + H_2O = 2KOH$$

These add up to:

$$Zn + KOH + HgO = KHZnO_2 + Hg$$

Cells made according to the present invention, using an electrolyte which is substantially saturated with zinc as alkali zincate, may be expressed as:

$$Zn | KOH, H_2O, K_2ZnO_2 | HgO$$

The reactions taking place in these cells in operation, during which the zinc hydroxide formed at the anode is not dissolved, may be expressed as follows:

At anode:

$$Zn + 2F = Zn^{++}$$
$$2KOH = 2K^+ + 2OH^-$$
$$Zn^{++} + 2OH^- = Zn(OH)_2$$

At cathode:

$$2K^+ - 2F = 2K$$
$$2K + HgO = K_2O + Hg$$
$$K_2O + H_2O = 2KOH$$

These add up to:

$$Zn + KOH, H_2O + HgO = Zn(OH)_2 + Hg + KOH$$

The zinc hydroxide precipitated on discharge remains at the anode and builds up as a film thereon. A sufficiently large area of zinc is provided so that the zinc hydroxide film will not build up into an excessively thick current-blocking layer before the depolarizing power of the cathode is substantially exhausted or the zinc is all consumed.

For greatest economy of cell materials the cathode would contain just sufficient available oxygen in the depolarizer to provide for the complete consumption of the zinc by the electrochemical operation. However, in practical manufacture it is not always economical to achieve a perfect balance of anode and cathode materials. I have found it practicable to use an excess of zince especially where relatively expensive depolarizers are used.

It is sometimes of advantage, however, to use an excess of depolarizer to avoid gas generation resulting from all of the depolarizer being consumed before the zinc. In cases where the depolarizer is considerably more expensive than the zinc, however, as with oxides of silver and mercury, it will be more economical to provide at least enough zinc completely to use this depolarizer and provide, along with it, another more economical depolarizer which is less readily reducible. The added depolarizer can be utilized either by mixing with the main depolarizer material, or as a separate layer beneath it, to provide for the remaining zinc, so that the total depolarizer used is in excess of the amount needed to completely consume the zinc. For example, a small amount of a copper oxide can be used with oxides of silver or mercury.

In order to obtain complete use of the zinc it is also desirable that the cross-section of the zinc, such as the thickness of the zinc foil, in case of a foil anode, or the size of the zinc powder, in case of a porous powder anode, be kept sufficiently small to permit substantially complete consumption of all of the zinc before the zinc hydroxide layer becomes so thick as to prevent efficient cell operation.

In practice I have found that when the electrolyte is substantially saturated with zincate and the amounts of zinc in the anode and available oxygen in the depolarizer are substantially balanced, the effective anode area, i. e. the area of anode surface to be contacted by the electrolyte, should be at least in the neighborhood of thirty square inches (30 sq. in.) per gram of available oxygen in the depolarizer, to insure low internal resistance throughout the life of the cell. It will be obvious that if an excess of depolarizer is used, or if complete use of either the zinc or the depolarizer is not contemplated, that this ratio may be somewhat reduced. For example, a reasonably efficient use of the cell materials can be attained with an anode area above about twenty square inches (20 sq. in.) per gram of available oxygen. The term "available oxygen" refers to the oxygen in the depolarizer material which is available by electro-chemical reduction of the cathode during use of the cell.

An embodiment of the present invention which is particularly adapted to tropical use where high temperatures and humidity are encountered may have structural features similar to those of the construction shown in Figures 1, 2 and 3. The steel can will have a cathode pellet of depolarizer material pressed into its bottom and such cathode may be formed of an oxide of silver, viz., AgO or Ag$_2$O, or a mixture of about ninety per cent (90%) mercuric oxide (HgO) and about ten per cent (10%) micronized graphite. If silver oxide is used the interior of the steel can should be silver plated. The anode roll of course will have the zinc foil thereof amalgamated and successive turns separated by an electrolyte carrier composed of hemp, cotton or viscose paper. The paper preferably will be saturated with potassium hydroxide solution having a KOH concentration of about thirty-seven per cent (37%) and containing dissolved zinc in a weight ratio to the KOH of about sixteen to one hundred (Zn 16:KOH 100), and carefully drained to assure immobilization of the electrolyte. The cathode should be isolated from the anode assembly by suitable barrier means, preferably a sheet of glycerine-plasticized polyvinyl alcohol or a porous layer of one of the inorganic barrier materials mentioned above.

By way of example, one cell having the construction shown in Figure 1 with a cathode of mercuric oxide mixed with ten per cent (10%) graphite and pressed to a density of 7.2, had a diameter of seven eighths of an inch (⅞ in.) and was five eighths of an inch (⅝ in.) high. The zinc anode was formed of two mil (2 mil) zinc foil corrugated with two mil (2 mil) deep corrugations, the corrugated foil strip being nine thirty-seconds of an inch (9/32 in.) width and thirty six inches (36 in.) long. The foil was wound up with two four mil (4 mil) porous paper spacers three eighths inch (⅜ in.) wide. The zinc projected ten mils (10 mils) at the top of the roll and the paper three thirty-seconds of an inch (3/32 in.) at the bottom. The barrier consisted of two one mil (1 mil) plasticized polyvinyl alcohol film discs.

Figures 4 to 17 of the drawings illustrate further embodiments of the invention, showing other means for obtaining efficient cell assemblies, extended effective anode surface areas, and other structurally useful features. The details of certain of these structures and combinations of certain features thereof are claimed specifically in the co-pending applications, referred to above. The similar parts of the various embodiments, so far as possible, have been numbered in the same manner as in the embodiment shown in Figures 1 to 3.

Figure 4 shows a section of a flat dry primary cell having a folded perforated zinc foil anode 134 and a cathode pellet 131 of a conductive oxygen-yielding compound. The cell container and positive terminal comprises a shallow circular cup 130 of steel or other metal inert to the alkaline electrolyte. The side wall of the cup is preferably coated with an insulating coating 136 inert to the electrolyte, for example, polystyrene applied as a xylol solution and dried. Cathode composition 131 is pressed into a depression of reduced diameter in the bottom of the cup under high pressure. If desired the bottom of the cup may first be sprayed with a graphite paint to improve the contact between the cathode and the bottom. A suitable paint may be formed of ten per cent (10%) by weight of graphite and two per cent (2%) ethyl cellulose in a xylol solution.

A porous barrier disc 132 is located over the depolarizer layer and it may be in the form of a disc pressed from dry magnesium hydroxide powder. It is also possible to spray the layer 132 onto the cathode by using a suspension of the powder in a volatile solvent containing a small proportion of a dissolved resin binder, such as polystyrene.

A paper disc 145 of porous paper is disposed over barrier disc 132. Alkali-treated natural cellulose paper, or viscose paper made of regenerated cellulose fibres are satisfactory, as well as polystyrene fibre sheet. The paper disc is immersed in the cell electrolyte, drained of free-flowing liquid and laid on the barrier disc 132. Some of the electrolyte then passes into and impregnates the barrier 132.

The cell anode 134 comprises a perforated zinc foil cut out into a chain of discs joined at their edges as shown in Figure 5. The chain is folded at the joined areas to bring the discs into a stack and a porous paper disc 135 is inserted between each adjacent pair of zinc discs. The circular paper discs are cut away at one side to leave straight edges 146 (Figure 6) which fit into the folds of the zinc anode 134. Perforations 144 in the several joined anode discs are preferably in substantial alignment when the anode is folded, as shown in Figure 4.

The paper for discs 135 may be porous cellulose or viscose paper which has been pre-shrunk by running it through a solution of seventy-five to one hundred grams (75 to 100 g.) KOH in one hundred cubic centimeters (100 cc.) of water, washing in water and drying. Discs punched from this paper may be of the same diameter as the zinc discs.

The zinc anode should be amalgamated to minimize local couples and contact action with paper. The preferred method is to add three per cent (3%) of mercuric cyanide to the electrolyte. The folded anode structure with paper spacers is then dipped in the solution for one-half minute (½ min.) after which the unit is drained of free-flowing electrolyte and pressed making it ready for use. The mercuric cyanide reacts with the zinc to amalgamate its surface. Another method of amalgamation is to bring a few drops of mercury into contact with the zinc while it is immersed in the normal cell electrolyte.

The folded anode, impregnated with electrolyte, is held in pressure contact with paper spacer disc 145 by top disc 137, which also comprises the negative terminal of the cell. Top disc 137 comprises a steel disc which has been hot zinc dipped to coat it with a thin layer of zinc 147 and then superficially amalgamated. A zinc coating three tenths of a mil (.3 mil) thick which has been amalgamated in the aforementioned mercuric cyanide electrolyte is suitable.

An internally-grooved neoprene ring grommet 138 encloses the edge of the top disc. The flange 140 of the steel cup 130 is rolled or spun down over the grommet and applies a constant pressure to it, thereby closing the cell in an airtight manner. This cell has a comparatively short electrolyte path to all parts of the zinc anode surface so that the entire area is very effectively used.

Figures 7 and 8 show another flat cell construction and represent another method of obtaining an extended effective anode area. The cell comprises a shallow steel cup 230 containing a depolarizer cathode 231 and a porous pressed zinc powder anode 234. The depolarizer composition 231 is pressed into the bottom of the container 230 and a barrier disc 232, is pressed on top of it. An insulating sleeve ring 236 is set on the barrier and against the side wall of the cell. This may be of polystyrene or other alkali resistant pliant material. One or more porous fibre discs 245 are impregnated with electrolyte and laid on the barrier inside the sleeve 236. The anode comprises a porous disc 234 pressed from iron-free zinc powder of about 60 mesh particle size, containing four hundredths of one per cent (0.04%) lead, which has been amalgamated with five to fifteen per cent (5 to 15%) of mercury. Amalgamated zinc top 237 presses against the top of the anode and holds it tightly against fibre disc 245. The top 237 is sealed in the mouth of cup 230 by neoprene grommet 238 which is compressed against it by the enclosing edge of the container.

Figure 9 is a cross section of another flat cell construction and Figure 10 shows a higher voltage battery made therefrom. Each individual cell comprises a steel disc 330 having a central depression therein in which is pressed a cathode layer 331, a paper spacer 332 impregnated with electrolyte as previously described, an anode 334 comprising a porous zinc amalgam powder pellet and a zinc top 337 in contact with the anode. Sealing is effected and electrolyte creepage along the zinc surface prevented by the use of a pair of neoprene rings 336 and 338. Ring 338 is of smaller diameter than zinc top 337. Prior to assembly of the cell ring 338 is placed against a zinc disc which is to form top 337 and the edge 340 of the zinc disc is spun over the ring 338 and against it to cause compression and thereby effecting tight pressure sealing between the neoprene ring and the zinc surface surrounding the central area which is to engage the anode 334. The other neoprene ring 336 is of substantially the same outer diameter as steel disc 330 and is laid or cemented on the disc surrounding the central depression in which the depolarizing layer has been pressed. The impregnated spacer comprising a plurality of paper discs 332 is laid on the cathode within the central opening of ring 336 and the zinc top 337, carrying sealing ring 338 and the impregnated zinc amalgam anode pellet 334, is placed against the bottom assembly to complete the cell unit. Any number of these cell units or assemblies may be stacked to produce a battery of any desired voltage.

Figure 10 shows a battery formed by lining a steel can 350 with a Pliofilm tube 351 and then stacking the cell assemblies in the can with the steel disc 330 of the bottom assembly against the bottom wall of the can. A sealing ring 352 of neoprene or other sealing material is placed over the top of the stack and the edge of the can is spun down over the sealing ring to apply compression to the stack effectively sealing each cell as well as the entire battery.

Figures 11 and 12 illustrate a cylindrical electrode construction in a primary cell embodying features of the present invention. A deep steel container 430 has a liner disc 436 of polystyrene on its bottom, and upon the latter rest a group of concentric cylinders. An outer cylinder 431 is of pressed cathode-depolarizer composition and is fitted or pressed rather tightly against the cylindrical can wall.

The anode comprises a porous amalgamated zinc powder cylinder 434 which is of greater length to stand slightly higher than the depolarizer electrode. Between the anode 434 and the depolarizer cathode 431 is a spacer winding, the layers 435 adjacent the zinc being of porous paper and the outer layers 432, adjacent the cathode being a barrier material such as glycerine-plasticized polyvinyl alcohol film. Instead of layers of sheet materials, the spacer can be of a compressed absorbent material such as a pressed cylinder of a mixture of magnesium hydroxide and magnesium silicate, polystyrene fibres or a ceramic material.

The hollow interior of the anode cylinder 434 is filled with a wad or roll 448 of porous polystyrene fibre or paper. The electrolyte is added to this roll and quickly passes through the porous anode 434 and the spacer layers 435 and 432 by capillary action and even to some extent into the depolarizer to effect uniform distribution of electrolyte. No excess free-flowing electrolyte is allowed to remain. The spacer comprising layers 435 and 432 swells in the electrolyte exerting a pressure against the anode and cathode cylinders. Polystyrene ring disc 446 covers the top of cylinder 431 and spacers 435 and 432.

The amalgamated zinc top 437 is pressed against the top end of anode cylinder 434 and is sealed in the mouth of the container by neoprene grommet 438. It will be noted that the length of the cell can be varied without changing the ratio of the anode and cathode volumes or surfaces.

In cases where cells of the highest instantaneous current capacity and lowest internal resistance are required, and for low temperature operation where the electrical conductivity of the electrolyte becomes lower, it is desirable to provide a short electrolyte path of large area. Constructions embodying this advantage may utilize spiral-wound anodes and cathodes interleaved with and separated by layers of electrolyte carrier and barrier material to form a roll.

Figures 13 and 14 illustrate one structure of this roll type, Figure 13 showing the assembly of the electrode-spacer unit and Figure 14 being a longitudinal section of a complete cell. The anode comprises a strip of corrugated zinc foil 534, the cathode is a strip of steel sheet 531 coated with a depolarizer composition 541 and a binder applied in a solvent suspension by spreading, and the spacing means may comprise sheets 532 of plasticized polyvinyl alcohol film adjacent the cathode and porous paper 535 adjacent the anode. The solvent suspension may comprise, for example, cupric oxide or mercuric oxide and graphite together with a binder of polyvinyl chloride in ether as a solvent for the binder, as disclosed, for example, in my aforementioned applications Serial Nos. 468,386 and 473,320. The anode and cathode sheets 534 and 531 are arranged in staggered fashion and are rolled up with the spacer sheets 532 and 535 as shown in Figure 13 with the anode projecting at the top of the roll and the cathode at the bottom.

The electrode-spacer unit of the roll type cell is impregnated with electrolyte and the zinc foil 534 amalgamated. The roll unit is then inserted in a steel can 530, having a relatively rigid sleeve 536 of insulating material or steel lining its side wall. A steel spring spider 549 is provided in the bottom of the can 530 to make pressure contact with the projecting cathode edge. A top disc 537 of amalgamated zinc is placed in pressure contact with the projecting zinc foil edge and sealing grommet 538 rests on the top edge of sleeve 536 the edge of the container being spun over to compress the grommet against the top disc and sleeve.

Figure 15 illustrates a cell having an insulating side wall and conductive ends which may be constructed as follows:

Container 630 is of molded plastic such as polyethylene, ethyl cellulose, nylon, polystyrene or methyl methacrylate resin. A large headed zinc rivet 637 is molded into the bottom of the container with its shank 627 extending through the bottom to an external head 628 under which a terminal lug 629 is secured. A cylindrical anode disc 634 comprising a porous body pressed from sixty (60) mesh zinc powder containing forty-five thousandths of one per cent (.045%) lead and amalgamated is placed in the container against the zinc rivet with which it readily forms an amalgam bond.

Spacer roll 645 is formed from a roll of corrugated eight mil (8 mil) porous paper, such as Dexter paper, or alkali-resistant paper made in the manner described for spacer 35 of Figure 1, having two mil (2 mil) corrugations. The roll is impregnated with the electrolyte previously described whereupon the paper swells into the space provided by the corrugations. The roll is drained of free running electrolyte only and placed on top of the anode 634.

A combined barrier and sealing ring is made as follows: A circular hole the diameter of the inside of the container is punched in a sheet of neoprene. A layer of two mil (2 mil) polyvinyl alcohol film is cemented to the neoprene sheet so as to cover the entire area as well as the hole, using neoprene cement. A disc is then punched from this composite sheet, with an outer diameter the same as the outer diameter of the top edge of the container. This composite member comprising neoprene ring 638 and barrier disc 632 is placed on the top edge of the container.

A cathode body 631 is pressed into a recess in a steel cup member 620. The cup has a plane flange 621 surrounding the recess and a cylindrical flange 622 extending up from the outer edge of the plane flange. The cup is placed over the end of the plastic container 630 with the surface of the cathode 631 and the plane flange 621 resting on the barrier 632. The cylindrical flange 622 is then bent or spun in over rim 639 of container 630 to compress neoprene ring 638 and seal the cell.

The cathode 631 can be formed of any of the depolarizer compositions previously described. The sealing of the edge of the barrier 632 between the steel cup wall 621 and neoprene ring 638 insures against any electrolyte travel around the edge of the barrier and makes an especially effective construction for use with soluble or highly oxidizing depolarizers such as the permanganates and lead peroxide.

Figures 16 and 17 illustrate another anode unit which can be used in the cells of Figure 1 or Figure 15. The anode sheet 735 (Figure 16) comprises a strip of paper, cloth, regenerated sheet cellulose, polystyrene fibre or the like, on one face of which is sprayed a layer of zinc 734 with a metal spray gun, such as a Schoop gun. One edge and one end of the strip is masked during spraying so that they remain uncoated. The strip is wound up with the uncoated end wrapped around the outside of the roll and the latter is inserted in an insulating sleeve 736 to form an anode unit (Figure 17). The zinc of this unit may be subsequently amalgamated.

Immobilization of cell electrolyte may be attained in other ways, such as by solidification thereof. Such feature may be embodied in a cell structure, such as that proposed in Figures 13 and 14, wherein anode and cathode foils interleaved with suitable spacing means are interwound into a spiraled roll. The resultant roll may be impregnated with an electrolyte of high alkali concentration in fluid condition at a relatively high temperature so that upon cooling, the electrolyte solidifies to an immobilized condition. For example, an aqueous solution containing sixty-five per cent (65%) of KOH and fifteen per cent (15%) of dissolved zinc oxide may be used.

Immobilization of the electrolyte may further be attained by thickening the same with particles of material substantially chemically inert in the cell to provide an immobile paste. Such particles may be formed of Dexter paper, filter paper, or other suitable organic materials such as those mentioned heretofore as barrier materials, as well as the inert inorganic barrier materials there also mentioned.

Dry batteries manufactured for the U. S. Army, made up of typical cells of the type described herein, have achieved the objects of this invention. For example, the BA38R battery (U. S. Army Signal Corps designation) consists of seventy-two cells of this invention in series, housed in a container 11½" x 1⅜" x 1⅜". These cells have the mercuric oxide-graphite cathodes. When tested under Signal Corps test specification, the battery gives twenty-four hours of service as contrasted with six hours for the BA38 battery (U. S. Army Signal Corps designation), occupying the same space, and composed of conventional zinc-carbon-ammonium chloride cells. After storage under tropical conditions, the operating life ratio is even more in favor of the BA38R. As compared with the BA38 which has a fairly rapid drop off in voltage during operating life, the BA38R maintains a relatively flat voltage discharge, thus keeping sensitivity of the transmitter-receiver at a high level.

Cells and batteries of the invention, as made for the U. S. Government in very large quantities, tested after long storage under varying temperature and humidity conditions, have shown negligible drop in operating life.

It will thus be seen that the objects set forth above and those made apparent in the above descriptions are efficiently attained and since certain changes may be made in the above construction and different embodiments of the invention could be made without departing from the scope thereof, it is intended that all matter contained in the above descriptions or shown in the accompanying drawings shall be interpreted as illustrative and not in a limiting sense.

Having described my invention, what I claim as new and desire to secure by Letters Patent is:

1. In an alkaline dry cell, the combination comprising, an amalgamated zinc anode, a cathode of depolarizer material comprising an electronically-conductive compressed coherent mass of low electrical resistance including an oxygen-yielding compound of a metal and finely divided inert material of higher conductivity uniformly mixed with said oxygen-yielding compound spaced from said anode, and an immobilized body of alkali metal hydroxide electrolyte initially containing a substantial quantity of alkali metal zincate in solution, said zincate being present in an amount sufficient to reduce the open circuit reactivity between said electrolyte and said anode to a negligible value.

2. In an alkaline dry cell, the combination as set forth in claim 1 characterized in that said combination is housed in an air tight assembly.

3. In an alkaline dry cell, the combination as set forth in claim 1 characterized in that said oxygen-yielding compound comprises mercuric oxide and said electrolyte comprises potassium hydroxide.

4. In an alkaline dry cell, the combination as set forth in claim 1 characterized in that said oxygen-yielding compound comprises potassium permanganate.

5. In an alkaline dry cell, the combination as set forth in claim 1 characterized in that said amalgamated zinc anode comprises pressed amalgamated zinc powder.

6. In an alkaline primary dry cell, the combination comprising, an amalgamated zinc anode, a solid cathode of depolarizer material comprising an electronically-conductive coherent mass including an oxygen-yielding compound of a metal spaced from said anode, and an immobilized body of alkali metal hydroxide electrolyte initially containing a substantial quantity of alkali metal zincate, the amount of zinc present as zincate in said electrolyte being at least equal to one-half the total amount of zinc which said electrolyte is capable of dissolving.

7. In an alkaline dry cell, the combination as set forth in claim 6 characterized in that said combination is housed in an air tight assembly.

8. In an alkaline dry cell, the combination as set forth in claim 6 characterized in that said oxygen-yielding compound comprises mercuric oxide and said electrolyte comprises potassium hydroxide.

9. In an alkaline dry cell, the combination as set forth in claim 6 characterized in that said oxygen-yielding compound comprises silver oxide.

10. In an alkaline dry cell, the combination as set forth in claim 6 characterized in that said oxygen-yielding compound comprises potassium permanganate.

11. In an alkaline dry cell, the combination as set forth in claim 6 characterized in that said amalgamated zinc anode comprises cohering amalgamated zinc particles.

12. A primary cell comprising, in combination, a coherent conductive cathode containing mercuric oxide as the active ingredient intimately mixed with graphite, an amalgamated zinc anode, an immobilized body of electrolyte comprising an aqueous potassium hydroxide solution at least one-half saturated with dissolved zinc oxide interposed between said anode and cathode and in contact therewith, said body of electrolyte being incapable of dissolving and holding in solution all the zinc of said anode, said anode containing interstices communicating with the surface of said anode in contact with said electrolyte body, and said electrolyte extending into said interstices, whereby the effective anode area is extended beyond that of a solid anode body.

13. An alkaline dry cell comprising a coherent conductive cathode containing an electrolytically-reducible oxygen-yielding compound, an amalgamated zinc anode, an electrolyte-spacer member interposed between said anode and cathode, a closure and terminal assembly enclosing and holding said anode, cathode and electrolyte-spacer assembly together, said anode having a relatively large surface area being characterized by interstices communicating with the space between said anode and cathode occupied by said electrolyte-spacer member, said electrolyte-spacer member comprising an aqueous alkaline electrolyte containing dissolved zinc to reduce open-circuit reactivity of said electrolyte with said anode and an immobilizer for said electrolyte, said electrolyte entering the interstices of said anode and completing an electrolyte path between said cathode and substantially the entire surface of said anode.

14. An alkaline dry cell comprising a coherent conductive cathode containing an electrolytically-reducible oxygen-yielding compound, an amalgamated zinc anode, an electrolyte-spacer member interposed between said anode and cathode, a closure and terminal assembly enclosing and holding said anode, cathode and electrolyte-spacer assembly together under pressure, said anode having a relatively large surface area characterized by interstices communicating with the space between said anode and cathode occupied by said electrolyte-spacer member, said electrolyte-spacer member comprising an aqueous alkaline electrolyte containing dissolved zinc to reduce open-circuit reactivity of said electrolyte with said anode and an immobilizer for said electrolyte, said electrolyte entering the interstices of said anode and completing an electrolyte path between said cathode and substantially the entire surface of said anode.

15. In an alkaline dry cell, the combination comprising, an amalgamated zinc anode, a cathode of depolarizer material comprising an electronically-conductive coherent mass including an oxygen-yielding compound of a metal spaced from said anode, and an electrolyte formed of an aqueous solution of potassium hydroxide initially containing a substantial quantity of alkali metal zincate, and interposed between and contacting said anode and cathode, the zincate in said electrolyte containing about between ten (10) and twenty (20) grams of zinc for each one hundred (100) grams of potassium hydroxide used in preparing said electrolyte solution.

16. A sealed alkaline primary dry cell comprising, in combination, a coherent conductive depolarizing cathode comprising an electrolytically-reducible oxygen-yielding compound, an amalgamated zinc anode spaced therefrom, an immobilized body of aqueous alkali metal hydroxide electrolyte in contact with said anode and cathode, said electrolyte initially containing dissolved zinc to limit gas generation within said cell, and an airtight enclosure containing said cathode, anode and electrolyte, the quantity of zinc in said anode exceeding the zinc-dissolving capacity of said body of electrolyte and the effective area of said anode in contact with said electrolyte being sufficient to permit effective cell operation with electrochemical consumption of the zinc of said anode by said electrolyte and the formation of a zinc hydroxide layer over said effective anode area until either the zinc of said anode or the available oxygen in said cathode is substantially consumed.

17. A sealed alkaline primary dry cell as claimed in claim 16 in which said amalgamated zinc anode comprises a porous body of amalgamated zinc powder.

18. A sealed alkaline primary dry cell as claimed in claim 16 in which said oxygen-yielding compound comprises silver oxide.

19. A primary current producing dry cell comprising a sealed container, an anode therein of amalgamated zinc, a cathode therein comprising a compressed finely-divided electrolytically-reducible oxygen yielding compound, an alkaline electrolyte initially reacted with and containing dissolved zinc to limit gas generation and reduce the open circuit reactivity between said electrolyte and said anode to a negligible value, a porous spacer of non-conductive material having electrolyte absorbed therein interposed between anode and cathode, means to maintain the cathode-spacer-anode assembly under pressure, said cell having substantially all of its electrolyte confined within the spacer and any interstices of the electrodes.

20. A primary current producing dry cell comprising a sealed container, an anode of extended area comprising amalgamated zinc, a cathode comprising a finely divided electrolytically reducible oxygen compound of a metal having intimately admixed therewith a relatively smaller quantity of micronized graphite of smaller particle size, an alkaline electrolyte initially reacted with and containing dissolved zinc to limit gas generation in said cell and reduce the open circuit reactivity between said electrolyte and said anode to a negligible value, a porous spacer of non-onductive material having electrolyte absorbed therein interposed between anode and cathode, means to maintain the cathode-spacer-anode assembly under pressure, said cell having substantially all of its electrolyte confined within the spacer and the interstices of the electrodes.

21. An alkaline dry cell comprising, in combination, an air tight enclosure, an amalgamated zinc anode, a cathode of depolarizer material comprising an electronically-conductive compressed coherent mass of low electrical resistance including an oxygen-yielding compound of a metal and a relatively smaller quantity of finely divided inert material of higher conductivity intimately mixed with said oxygen-yielding compound, a body of alkali metal hydroxide electrolyte initially containing in solution a substantial quantity of alkali metal zincate to reduce open-circuit reactivity between said electrolyte and said anode to a negligible value, and means immobilizing said electrolyte across the electrolyte path between cathode and anode and substantially preventing migration of deleterious solids from said cathode.

22. An alkaline dry cell comprising, in combination, an air-tight enclosure, an amalgamated zinc anode therein, a cathode of depolarizer material in said enclosure and comprising an electronically-conductive compressed coherent mass of low electrical resistance including an oxygen-yielding compound of a metal, an immobilized body of alkali metal hydroxide electrolyte initially containing a substantial quantity of alkali metal zincate in solution, and ionically permeable barrier means in contact with and extending across the active accessible surface of said cathode, said barrier means being sufficiently impermeable to prevent migration of solids from the cathode to the anode.

23. An alkaline dry cell comprising, in combination, an air-tight enclosure, an amalgamated zinc anode of extended area therein, a cathode of depolarizer material in said enclosure and comprising an electronically-conductive compressed coherent mass of low electrical resistance including an oxygen-yielding compound of a metal, an immobilized body of alkali metal hydroxide electrolyte initially containing a substantial quantity of alkali metal zincate in solution, and ionically permeable barrier means in contact with and extending across the active accessible surface of said cathode, said barrier means being sufficiently impermeable to prevent migration of solids from the cathode to the anode.

24. An alkaline dry cell comprising, in combination, an air-tight enclosure, an amalgamated zinc anode therein, a cathode of depolarizer material in said enclosure and comprising an electronically-conductive coherent mass including an oxygen-yielding compound of a metal, an immobilized body of alkali metal hydroxide electrolyte initially containing a substantial quantity of alkali metal zincate and interposed between and contacting said anode and cathode, and minutely porous barrier means isolating said cathode from said anode, said barrier means being ionically permeable but restricting travel of deleterious compounds from said cathode to said anode, said anode having at least thirty square inches of effective anode surface per gram of oxygen available from said depolarizer material.

25. An alkaline dry cell comprising, in combination, an air-tight enclosure, an amalgamated zinc anode therein, a cathode of depolarizer material in said enclosure and comprising an electronically-conductive compressed coherent mass of low electrical resistance including an oxygen-yielding compound of a metal, an alkali metal hydroxide electrolyte initially containing a substantial quantity of alkali metal zincate in solution, and interposed between and contacting said anode and cathode, a porous electrolyte carrier of material substantially chemically inert in the cell separating said anode and cathode and immobilizing said body of electrolyte, and ionically-permeable barrier means in contact with and extending across the active accessible surface of said cathode, said barrier means being sufficiently impermeable to prevent migration of solids from the cathode to the anode.

26. An alkaline dry cell comprising, in combination, an air-tight enclosure, an amalgamated zinc anode therein, a cathode of depolarizer material in said enclosure and comprising an electronically-conductive coherent mass including an oxygen-yielding compound of a metal, a porous electrolyte carrier of material substantially chemically inert in the cell interposed between said cathode and anode and contacting the latter, partially permeable barrier means of material substantially chemically inert in the cell located adjacent to and in contact with said cathode and isolating it from said carrier and anode, said barrier means being sufficiently impermeable to prevent migration of solids from the cathode to the anode and an alkali metal hydroxide electrolyte initially containing a substantial quantity of alkali metal zincate in solution and impregnating said carrier, said cell being free of freely flowing electrolyte and said electrolyte permeating said barrier means.

27. An alkaline dry cell comprising, in combination, an amalgamated zinc anode, a cathode of depolarizer material comprising an electronically-conductive coherent mass including an oxygen-yielding compound of a metal spaced from said anode, an immobilized body of alkali metal hydroxide electrolyte initially containing a substantial quantity of alkali metal zincate in solution and interposed between and contacting said anode and cathode, and partially permeable barrier means isolating said cathode from said anode, an air-tight enclosure for said elements comprising a metallic positive terminal container in electrical contact with said cathode, a metallic negative terminal in electrical contact with said anode and accessible externally of said enclosure, insulating sealing means spacing said terminals from each other, and a lining of electrolyte-impermeable insulating material interposed between said anode and the inner wall of said container.

28. An alkaline dry cell comprising, in combination, an amalgamated zinc anode, a cathode of depolarizer material comprising an electronically-conductive coherent mass including an oxygen-yielding compound of a metal spaced from said anode, an immobilized body of alkali metal hydroxide electrolyte initially containing a substantial quantity of alkali metal zincate in solution and interposed between and contacting said anode and cathode, and partially permeable barrier means in contact with said cathode and isolating said cathode from said anode, said barrier means being ionically permeable but restricting travel of deleterious compounds from said cathode to said anode, an air-tight enclosure for said elements comprising a metallic can having said cathode in electrical contact therewith and serving as a positive terminal, a metallic disc insulated from said can and serving as a closure therefor, said disc being in intimate and direct electrical contact with said anode to serve as the negative terminal, and a lining of electrolyte-impermeable insulating material interposed between said anode and the inner wall of said can.

29. An alkaline dry battery comprising in combination an amalgamated zinc anode, a cathode of depolarizer material comprising an electronically conductive coherent bonded mass of low electrical resistance including an oxygen-yielding compound of a metal and a relatively smaller quantity of finely divided inert material of higher conductivity intimately mixed with said oxygen-yielding compound, an immobilized body of alkali metal hydroxide electrolyte initially containing in solution a substantial quantity of alkali metal zincate to reduce open-circuit reactivity between said electrolyte and said anode to a negligible value, and ionically-permeable barrier means extending across the electrolyte path between cathode and anode and substantially preventing migration of solids deleteriously affecting the life of the battery.

30. An alkaline primary dry cell, comprising, in combination, an amalgamated zinc anode having an extended surface area, a depolarizing cathode of an oxygen-yielding compound of a metal, substantially inert spacing means between and against the accessible surfaces of such electrodes, said means being relatively more porous adjacent said anode and relatively less porous adjacent said cathode the density of the spacing means in contact with the cathode being sufficient to prevent migration of solids from the cathode to the anode, and an alkali metal hydroxide electrolyte initially containing a substantial quantity of alkali metal zincate permeating said spacing means, said parts being assembled under pressure in an air-tight container.

31. An alkaline dry cell comprising, in combination, an amalgamated zinc anode, a cathode of depolarizer material comprising an electronically-conductive bonded coherent mass of low electrical resistance including an oxygen-yielding compound of a metal spaced from said anode, an immobilized body of alkali metal hydroxide electrolyte initially containing a substantial quantity of alkali metal zincate and interposed between and contacting said anode and cathode, and partially permeable barrier means isolating said cathode from said anode, said anode having at least approximately 20 square inches of effective anode surface per gram of oxygen available from said depolarizer material.

32. A primary cell comprising, in combination, a coherent conductive depolarizing cathode containing an oxygen-yielding compound, an amalgamated zinc anode having an effective surface area which is in a ratio of at least twenty (20) square inches per gram of oxygen available from said compound, an absorbent spacer interposed between and in contact with said anode and cathode, an aqueous alkaline electrolyte held absorbed in said spacer and in contact with said cathode and anode throughout their effective surface areas, said electrolyte containing sufficient alkali metal zincate to reduce the open-circuit chemical attack on said anode to a negligible value.

33. A primary cell comprising, in combination, a coherent conductive cathode containing an oxygen-yielding depolarizing compound, an amalgamated zinc anode having an effective surface area in a ratio of at least twenty (20) square inches per gram of oxygen available in said cathode, an absorbent spacer interposed between and in contact with said anode and cathode, an alkaline electrolyte held absorbed in said spacer and in contact with said cathode and anode throughout their effective surface areas, said electrolyte comprising an aqueous solution of potassium hydroxide containing sufficient potassium zincate to reduce the open-circuit chemical attack on said anode to a negligible value.

34. A primary cell comprising, in combination, a coherent conductive cathode containing an oxygen-yielding depolarizing compound, an amalgamated zinc anode having an effective surface area which is in a ratio of at least twenty (20) square inches per gram of oxygen available in said cathode, an absorbent spacer interposed between and in contact with said anode and cathode, an aqueous alkali metal hydroxide electrolyte held absorbed in said spacer and in contact with said cathode and anode throughout their effective surface areas and providing an electrolyte path between said anode and cathode, said spacer including a minutely porous electrolyte-absorbent barrier extending across said electrolyte path to effectively prevent travel of deleterious materials from said cathode to said anode, said electrolyte containing sufficient alkali metal zincate to reduce the open-circuit chemical attack on said anode to a negligible value.

35. A primary cell comprising, in combination, a coherent conductive cathode containing an oxygen-yielding depolarizing compound, an amalgamated zinc anode having an effective surface area in a ratio of at least thirty (30) square inches per gram of oxygen available in said cathode, an absorbent spacer interposed between and in contact with said anode and cathode, an alkaline electrolyte held absorbed in said spacer and in contact with said cathode and anode throughout their effective surface areas, said electrolyte comprising an aqueous solution of potassium hydroxide and potassium zincate in proportions equivalent to those resulting from reacting a thirty (30) to fifty (50) per cent KOH solution with about ten (10) to twenty (20) grams of zinc for each one hundred (100) grams of KOH used.

36. An alkaline dry cell comprising, in combination, an air-tight enclosure, an amalgamated zinc anode therein, a cathode of depolarizer material in said enclosure and comprising an electronically-conductive coherent mass including an oxygen-yielding compound of a metal, a porous electrolyte carrier of material substantially chemically inert in the cell interposed between said cathode and anode and contacting the latter, partially permeable barrier means of material substantially chemically inert in the cell located adjacent to and in contact with said cathode and isolating it from said carrier and anode, and a liquid body of alkali metal hydroxide electrolyte initially containing a substantial quantity of alkali metal zincate and impregnating said carrier, said cell being free of freely flowing electrolyte, and said electrolyte permeating said barrier means, said anode having at least thirty square inches of effective anode surface per gram of oxygen available from said depolarizer material.

37. An alkaline dry cell, comprising, in combination, an amalgamated zinc anode formed to provide a relatively high surface-to-volume ratio, a coherent conductive depolarizing cathode of mercuric oxide intimately mixed with graphite, and an immobilized electrolyte formed of an aqueous solution of potassium hydroxide initially containing a substantial quantity of potassium zincate, the zincate in said electrolyte containing between ten (10) and twenty (20) grams of zinc for each one hundred (100) grams of KOH used in preparing said electrolyte solution.

38. An alkaline dry cell as claimed in claim 37 characterized in that said graphite is micronized natural graphite.

39. A dry primary cell in condition for use comprising, in combination, a zinc anode of extended surface area, a solid coherent conductive cathode containing an electrolytically-reducible oxygen-yielding compound and a relatively smaller quantity of finely divided inert material of higher conductivity uniformly mixed with said oxygen-yielding compound, and an immobilized electrolyte formed of an aqueous solution of an alkali having zinc initially dissolved therein substantially to saturation.

40. A primary cell comprising an amalgamated zinc anode having an extended surface area and at least the surface thereof amalgamated with mercury, an electrolyte comprising a solution of alkali metal hydroxide substantially saturated with zinc oxide, and a depolarizer cathode formed of a reducible oxide mixed with a conductive material to increase the conductivity thereof, and alkali-resistant absorbent spacer material interposed between said anode and cathode, substantially all of said electrolyte being held absorbed in said spacer material.

41. A primary cell comprising an amalgamated zinc anode having an extended surface area and at least the surface thereof amalgamated with mercury, an electrolyte comprising a solution of alkali metal hydroxide substantially saturated with zinc oxide, and a depolarizer cathode formed of a reducible oxide mixed with a conductive material to increase the conductivity thereof, and alkali-resistant absorbent spacer material interposed between said anode and cathode, substantially all of said electrolyte being held absorbed in said spacer material, all of the parts and compositions in said cell being substantially free of active soluble salts and other impurities and a supporting terminal for said depolarizer cathode mixture comprising a metal inert to said electrolyte.

42. A primary cell comprising an amalgamated zinc anode having an extended surface area and at least the surface thereof amalgamated with mercury, an electrolyte comprising a solution of alkali metal hydroxide substantially saturated with zinc oxide, and a depolarizer cathode formed of a reducible oxide mixed with a conductive material to increase the conductivity thereof, and alkali-resistant absorbent spacer material interposed between said anode and cathode, substantially all of said electrolyte being held absorbed in said spacer material, a container for said cell parts formed of metal inert to said electrolyte, said container being in contact with said depolarizer cathode and thereby comprising the positive terminal of said cell, and a metal top for said container insulated from said container and in contact with said anode, said top thereby comprising the negative terminal of said cell.

43. A primary cell comprising an amalgamated zinc anode having an extended surface area and at least the surface thereof amalgamated with mercury, an electrolyte comprising a solution of alkali metal hydroxide substantially saturated with zinc oxide, and a depolarizer cathode formed of a reducible oxide mixed with a conductive material to increase the conductivity thereof, and alkali-resistant absorbent spacer material interposed between said anode and cathode, substantially all of said electrolyte being held absorbed in said spacer material, all of the parts and compositions in said cell being substantially free of active soluble salts and other impurities and a support for said depolarizer cathode mixture comprising a metal inert to said electrolyte, a container for said cell parts formed of metal inert to said electrolyte, said container being in contact with said depolarizer cathode and thereby comprising the positive terminal of said cell, and a metal top for said container in contact with said zinc anode and thereby comprising the negative terminal for said cell, and an insulating sealing member sealing said top in said container and held under compression between said container and top.

44. A primary cell comprising an amalgamated zinc anode having an extended surface area and at least the surface thereof amalgamated with mercury, an electrolyte comprising a solution of alkali metal hydroxide substantially saturated with zinc oxide, and a depolarizer cathode formed of a reducible oxide mixed with a conductive material to increase the conductivity thereof, and alkali-resistant absorbent spacer material interposed between said anode and cathode, substantially all of said electrolyte being held absorbed in said spacer material, all of the parts and compositions in said cell being substantially free of active soluble salts and other impurities and a support for said depolarizer cathode mixture comprising a metal inert to said electrolyte, a container for said cell parts formed of metal inert to said electrolyte, said container being in contact with said depolarizer cathode and thereby comprising the positive terminal of said cell, and a metal top for said container in contact with said zinc anode and thereby comprising the negative terminal for said cell, and an insulating sealing member sealing said top in said container and held under compression between said container and top, the outer surface of said top being amalgamated and a protective layer over said surface.

45. A primary cell comprising an amalgamated zinc anode having an extended surface area and at least the surface thereof amalgamated with mercury, an electrolyte comprising a solution of alkali metal hydroxide substantially saturated with zinc oxide, and a depolarizer cathode formed of mercuric oxide mixed with a conductive material to increase the conductivity thereof, and alkali-resistant absorbent spacer material interposed between said anode and cathode, substantially all of said electrolyte being held absorbed in said spacer material, said anode and cathode being separated by a layer of said spacer material at least 20 mils in thickness.

46. A dry primary cell comprising, in combination, a coherent conductive cathode containing an oxygen-yielding depolarizing compound, an anode formed of a porous coherent body of amalgamated zinc, an absorbent spacer interposed between and in contact with said anode and cathode, an aqueous alkaline electrolyte held absorbed in said spacer and in contact with said cathode and in the pores of said anode, said electrolyte containing sufficient alkali metal zincate to reduce the open-circuit chemical attack on said anode to a negligible value.

47. A dry primary cell as claimed in claim 46 characterized in that said porous coherent body of amalgamated zinc comprises cohering amalgamated zinc particles.

48. A primary cell comprising, in combination, a coherent conductive cathode containing an oxygen-yielding depolarizing compound, an anode formed of a porous coherent body of amalgamated zinc having an effective surface area which is in a ratio of at least twenty (20) square inches per gram of oxygen available in said cathode, an absorbent spacer interposed between and in contact with said anode and cathode, an aqueous alkali metal hydroxide electrolyte held absorbed in said spacer and in contact with said cathode and in the pores of said anode, whereby said electrolyte is in contact with the effective surface areas of said cathode and anode, said electrolyte containing sufficient alkali metal zincate to reduce the open-circuit chemical attack on said anode to a negligible value.

49. A primary cell comprising a conductive coherent cathode of an oxygen-yielding compound, an anode formed of a porous coherent body of amalgamated zinc, whereby said anode has an extended surface area and an absorbent spacer between said anode and cathode and in contact with a surface of each, an alkaline electrolyte held absorbed in said spacer and in said porous anode and forming an electrolyte path between said anode and cathode, at least part of said spacer comprising a minutely porous barrier layer across said electrolyte path and carrying absorbed electrolyte, said barrier layer substantially preventing travel of deleterious ingredients from said cathode to said anode, said electrolyte comprising an aqueous solution of potassium hydroxide containing substantial proportions of dissolved zinc whereby the open circuit chemical action of said electrolyte on said zinc is reduced.

50. A primary cell comprising, in combination a coherent conductive cathode containing an oxygen-yielding depolarizing compound, an anode formed of a porous coherent body of amalgamated zinc having a large effective surface area, an immobilized body of alkaline electrolyte in contact with said cathode and in the pores of said anode, whereby said electrolyte is in contact with the effective surface areas of said cathode and anode, said electrolyte comprising an aqueous solution of potassium hydroxide and potassium zincate in proportions equivalent to those resulting from reacting a thirty (30) to fifty (50) per cent KOH solution with between ten (10) and twenty (20) grams of zinc for each one hundred (100) grams of KOH used.

51. A primary cell comprising a conductive coherent cathode of an oxygen-yielding compound, an anode formed of a porous coherent body of amalgamated zinc, whereby said anode has an extended surface area absorbent spacer between said anode and cathode and in contact with a surface of each, an alkaline electrolyte held absorbed in said spacer and in said porous anode and forming an electrolyte path between said anode and cathode, at least part of said spacer comprising a minutely porous barrier layer across said electrolyte path and carrying absorbed electrolyte, said barrier layer substantially preventing travel of deleterious ingredients from said cathode to said anode, said electrolyte comprising an aqueous solution of potassium hydroxide containing substantial proportions of dissolved zinc whereby the open circuit chemical action of said electrolyte on said zinc is reduced, an air excluding container including conductive terminals and insulation separating them from each other, said container enclosing said anode, cathode and spacer elements, and said terminals being connected to said anode and cathode respectively, said container being substantially devoid of free flowing electrolyte.

52. A primary cell comprising, in combination, a coherent conductive cathode containing an oxygen yielding depolarizing compound, an anode formed of a porous coherent body of amalgamated zinc having an effective surface area in a ratio of at least thirty (30) square inches per gram of oxygen available in said cathode, an absorbent spacer interposed between and in contact with said anode and cathode, an alkaline electrolyte held absorbed in said spacer and in contact with said cathode and in the pores of said anode, whereby said electrolyte is in contact with the effective surface areas of said cathode and anode, said electrolyte comprising an aqueous solution of potassium hydroxide containing sufficient potassium zincate to reduce the open-circuit chemical attack on said anode to a negligible value.

53. A primary cell comprising, in combination a coherent conductive cathode containing an oxygen-yielding depolarizing compound, an anode formed of a porous coherent body of amalgamated zinc having an effective surface area in a ratio of at least thirty (30) square inches per gram of oxygen available in said cathode, an immobilized body of alkaline electrolyte in contact with said cathode and in the pores of said anode, whereby said electrolyte is in contact with the effective surface areas of said cathode and anode, said electrolyte comprising an aqueous solution of potassium hydroxide and potassium zincate in proportions equivalent to those resulting from reacting a thirty (30) to fifty (50) per cent KOH solution with between ten (10) and twenty (20) grams of zinc for each one hundred (100) grams of KOH used.

54. A primary cell comprising a steel shell having a recess therein and a depolarizer body comprising a reducible metal oxide in said recess in contact with said shell, a porous spacer in contact with the surface of said depolarizer, an alkaline electrolyte impregnating said spacer, an anode comprising a pressed pellet of amalgamated zinc powder in contact with the surface of said spacer opposite to said depolarizer, said electrolyte also impregnating said anode, a conductive metal terminal disc in contact with said anode and a hermetic seal of insulating material closing the space between the edges of said steel shell and said metal disc.

55. A primary cell comprising a steel container, a cathode comprising a depolarizer of reducible metal oxide selected from the group consisting of mercuric oxide and cupric oxide pressed into the bottom of said container, a porous spacer of fibrous sheet material over the top of said depolarizer, a porous anode of zinc amalgam on top of said spacer and spaced from the walls of said container, an electrolyte comprising a solution of KOH substantially saturated with potassium zincate impregnating said spacer and said anode, said container having a shoulder near its free edge, a metal cover for said container in contact with said anode and a sealing ring of yielding insulating material enclosing the edge of said cover and resting on said shoulder, the free edge of said container extending down over the top of said sealing ring and applying pressure thereto.

56. A flat primary cell comprising a shallow steel shell, a cathode layer of depolarizer composition in the bottom thereof, a layer of fibrous sheet spacer material over said depolarizer layer, a porous zinc amalgam plate on top of said fibrous spacer, an alkaline electrolyte impregnating said spacer and said zinc amalgam plate, a non-porous sheet metal top on said zinc amalgam plate in contact therewith and an insulating sealing ring of non-porous resilient material enclosing the edge of said sheet metal top, the free edge of said steel shell embracing said sealing ring and applying compression between said ring and said metal top.

57. A primary cell comprising a cylindrical steel cup, a cathode layer of depolarizer composition pressed in the bottom thereof, a layer of fibrous sheet spacer material over said depolarizer layer, a porous zinc amalgam cylinder in said cup with one end against said fibrous spacer, a layer of non-porous spacer material surrounding said cylinder and spacing it from the inner wall of said cup, a metal disc on top of said cylinder and an insulating sealing ring of non-porous resilient material enclosing the edge of said metal disc, the free edge of said steel cup embracing said sealing ring and applying compression between said ring and metal disc.

SAMUEL RUBEN.

REFERENCES CITED

The following references are of record in the file of this patent:

UNITED STATES PATENTS

| Number | Name | Date |
|---|---|---|
| 727,117 | Edison | May 5, 1903 |
| 1,644,344 | Martus et al. | Oct. 4, 1927 |
| 1,955,115 | Drumm | Apr. 17, 1934 |
| 1,106,540 | Broad | Aug. 11, 1914 |
| 1,624,845 | Nyberg | Apr. 12, 1927 |
| Re. 22,065 | Young | Apr. 7, 1942 |
| 1,322,486 | Evans | Nov. 18, 1919 |
| 2,233,593 | Eddy et al. | Mar. 4, 1941 |
| 1,611,153 | Benner et al. | Dec. 21, 1926 |

FOREIGN PATENTS

| Number | Country | Date |
|---|---|---|
| 493,694 | Great Britain | Oct. 12, 1938 |
| 16,471/15 | Great Britain | 1915 |
| 129,423 | Great Britain | July 8, 1919 |